(12) United States Patent
Sethi et al.

(10) Patent No.: US 7,840,695 B2
(45) Date of Patent: Nov. 23, 2010

(54) CAPACITY MANAGEMENT

(75) Inventors: Gurdev S Sethi, Kirkland, WA (US); Mohanraj Dharmarajan, Sammamish, WA (US); Kirk M Brackebusch, Duvall, WA (US); David S Callahan, Mukilteo, WA (US); Manish V Tangri, Redmond, WA (US); Mitchell G Lacey, Bellevue, WA (US); Aravind K Seshadri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 11/278,074

(22) Filed: Mar. 30, 2006

(65) Prior Publication Data

US 2006/0239281 A1    Oct. 26, 2006

Related U.S. Application Data

(63) Continuation-in-part of application No. 11/089,670, filed on Mar. 25, 2005, and a continuation-in-part of application No. 11/090,263, filed on Mar. 25, 2005.

(51) Int. Cl.
*G06F 15/16* (2006.01)
*G06F 15/173* (2006.01)

(52) U.S. Cl. ...................... 709/235; 709/224
(58) Field of Classification Search .................. 709/224, 709/235
See application file for complete search history.

(56) References Cited

U.S. PATENT DOCUMENTS 6,629,266 B1 * 9/2003 Harper et al. ................. 714/38

| | | |
|---|---|---|
| 2002/0064149 A1 | 5/2002 | Elliott et al. |
| 2003/0195967 A1 * | 10/2003 | Selgas et al. ................. 709/228 |
| 2003/0208533 A1 | 11/2003 | Farquharson et al. |
| 2004/0103150 A1 | 5/2004 | Ogdon et al. |
| 2005/0135316 A1 * | 6/2005 | Cromer et al. .............. 370/338 |
| 2005/0192957 A1 | 9/2005 | Newbold |
| 2006/0178923 A1 * | 8/2006 | Ricketts .......................... 705/8 |
| 2006/0209677 A1 | 9/2006 | McGee et al. |

OTHER PUBLICATIONS

Anonymous, "A treasure trove of products and services", Security Management, Arlington, Nov. 2003, vol. 47, Issue,11, pp. 94.
Ensenat-Acevedo, "Design, Development and Implementation of the Registration Server for Nettraveler Middleware System", University of Puerto Rico, Mayaguez, Puerto Rico, 2004.

* cited by examiner

*Primary Examiner*—Benjamin R Bruckart
*Assistant Examiner*—Noel Beharry
(74) *Attorney, Agent, or Firm*—Lee & Hayes, PLLC

(57) ABSTRACT

Capacity management is described. In an implementation, a method includes executing a module on a computing device to monitor use of a product during a measurement interval to determine a maximum capacity of the product used during the measurement interval and whether a capacity failure point is reached during the measurement interval. A learned capacity limit is set based on the monitoring for determining whether one or more of a plurality of clients, if any, are to receive a list which references at least the monitored product, wherein the learned capacity limit is set such that when the capacity failure point is not reached, the learned capacity limit is set according to the maximum capacity.

15 Claims, 6 Drawing Sheets

CAPACITY MANAGEMENT

RELATED APPLICATION

The present application claims priority under 35 U.S.C. §§119(e) and 120 as a continuation-in-part to U.S. patent application Ser. No. 11/089,670 (also referenced as 60/714, 523), filed Mar. 25, 2005, and titled "Capacity Management" and U.S. patent application Ser. No. 11/090,263, filed Mar. 25, 2005 and titled "Access Point Management", the entire disclosures of which are hereby incorporated by reference in their entirety.

TECHNICAL FIELD

The present invention generally relates to products having a usable capacity and more particularly relates to capacity management.

BACKGROUND

A user may encounter a variety of different products in a given day which have a usable capacity that is available to the user. For example, the user may utilize an access point to access the Internet via an Internet service provider, such as via dial-up access, a broadband connection (e.g., cable, satellite, digital subscriber line (DSL)), and so on. The access point, however, may have a limited capacity which may be provided to the user for accessing the Internet. Further, this capacity may decrease when other users also utilize the access point. Therefore, a user which utilizes the access point may have an effect on other users which utilize the access point.

To provide capacity to a plurality of users, the Internet service provider may employ a plurality of access points at a variety of different locations. Additionally, each access point may have different capacity considerations, such as differing amounts of capacity that are available to each of the users. Further, these capacity considerations may be ever changing such that the capacity considerations at one point in time may be different then at another point in time. Therefore, the Internet service provider may be faced with a difficult task of managing the capacity available from the plurality of access points such that each of the plurality of users has sufficient capacity.

Therefore, there is a continuing need for capacity management techniques.

SUMMARY

Capacity management is described. In an implementation, a method includes executing a module on a computing device to monitor use of a product during a measurement interval to determine a maximum capacity of the product used during the measurement interval and whether a capacity failure point is reached during the measurement interval. A learned capacity limit is set based on the monitoring for determining whether one or more of a plurality of clients, if any, are to receive a list which references at least the monitored product, wherein the learned capacity limit is set such that when the capacity failure point is not reached, the learned capacity limit is set according to the maximum capacity.

In another implementation, a method includes dynamically adjusting a connectivity value for each of a plurality of access points based on a relationship of a maximum capacity used to a learned capacity limit. Use of a subset of the plurality of access points is assigned, respectively, to one or more of a plurality of clients based on the connectivity value for each of the access points.

In a further implementation, a method includes determining whether a capacity failure point has been reached and a maximum capacity for each of a plurality of access points being utilized during a measurement interval. One or more access point lists are formed for one or more respective said clients, in which each of the access point lists references one or more of the access points based on the determination.

BRIEF DESCRIPTION OF THE DRAWINGS

The same reference numbers are utilized in instances in the discussion to reference like structures and components.

DETAILED DESCRIPTION

Overview

Products, such as access points, may provide varying degrees of capacity at various times. Accordingly, it may be difficult to determine the actual capacity of the product. Therefore, the product may be underutilized (which may result in lost business revenue to a provider of the product) or may be over-utilized, which may result in consumer frustration and consequently lost business revenue to the provider of the product. In an embodiment, capacity management techniques are described in which a capacity limit is "learned" (also referred to in the following discussion as a "learned capacity limit") by gathering data about current capacity situations in order to better determine capacity.

A plurality of access points, for example, may be configured as a corresponding plurality of dial-up access numbers which are provided by an Internet service provider for accessing the Internet. The Internet service provider may determine a learned capacity limit for each access number based on a historical value of maximum capacity prior to encountering a capacity failure point for the access number. The learned capacity limit may be utilized in a variety of ways. For example, the Internet service provider may use escalating disincentives as usage of the access number approaches the learned capacity limit. Thus, each access number may be used near capacity without undue inconvenience to users of the access number.

Although the following techniques are described for use in relation to an access point, the capacity management techniques may be utilized in a variety of instances. For example, an environment may be provided where an entity (e.g., a system) provides a plurality of products having generally equivalent functionality to various subscribers, such that a subscriber may choose any given product from that combination at a given time and utilize capacity from that product. The entity may manage the plurality of products utilizing the described capacity management techniques such that each of these subscribers is provided with a desired amount of capacity, e.g., by suggesting particular ones of the products for utilization by respective subscribers. In the following discussion, an exemplary environment is first described which operable to employ the capacity management techniques. Exemplary procedures are then described which may be implemented in the exemplary environment, as well as in other environments.

Exemplary Environment

Figure 1:
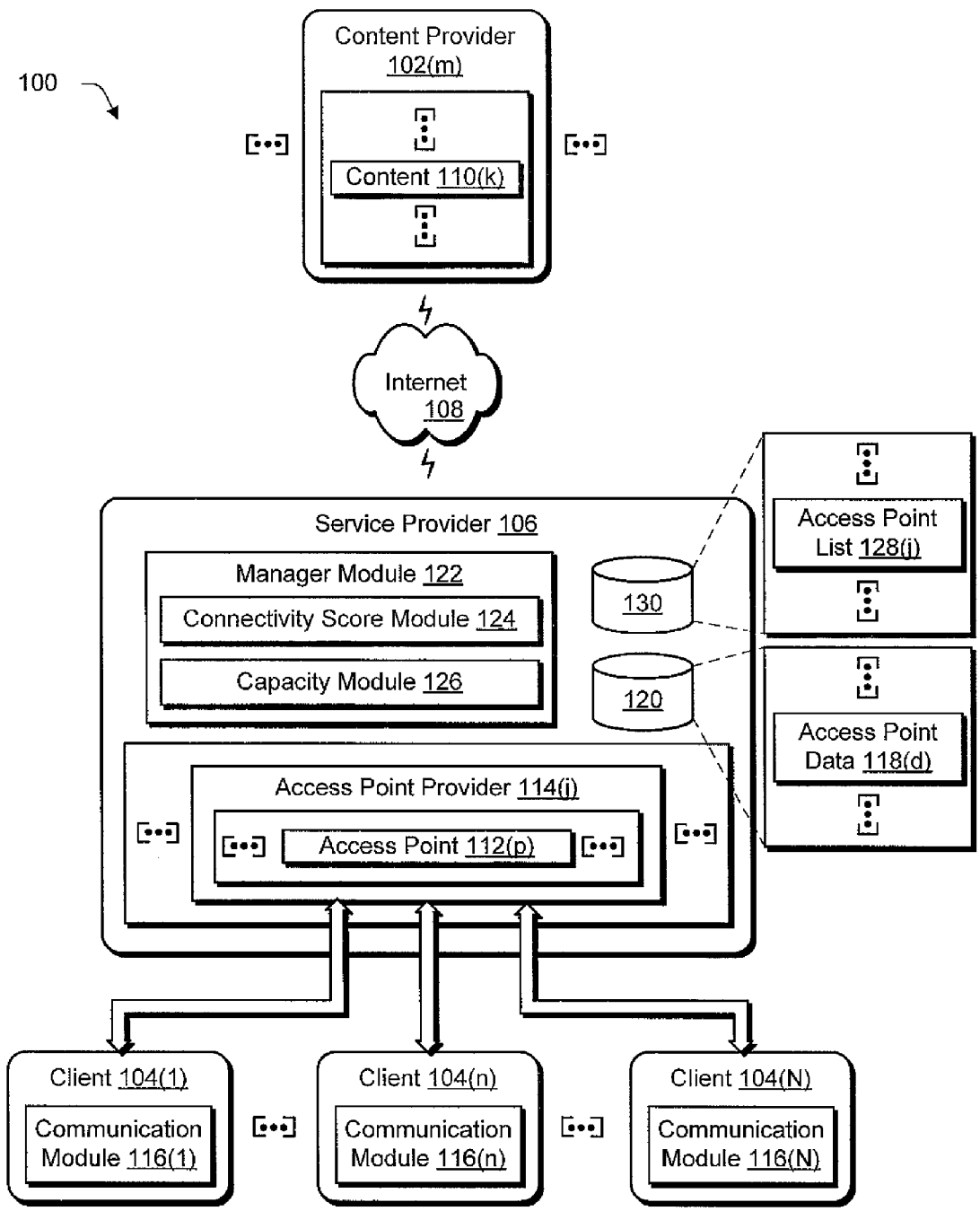
FIG. 1 is an illustration of an environment in an exemplary implementation that is operable to employ techniques for capacity management.

FIG. 1 is an illustration of an environment 100 in an exemplary implementation that is operable to employ techniques for managing capacity of access points. The illustrated environment 100 includes a plurality of content providers 102($m$) (where "m" can be any integer from one to "M"), a plurality of clients 104(1), . . . , 104($n$), . . . , 104(N), and a service provider 106. The clients 104(1)-104(N) may be configured in a variety of ways for accessing the service provider 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

The content provider 102($m$) is illustrated as being communicatively coupled to the service provider 106 over a network configured as the Internet 108. Although the network is illustrated as the Internet 108, the network may assume a wide variety of configurations. For example, the network may include a wide area network (WAN), a wireless network, and so on. Further, although a single network is shown, the network may be configured to include multiple networks for access to the Internet 108, such as a corporate intranet that is configured to include a gateway to the Internet, and so on. A wide variety of other instances are also contemplated.

The content provider 102($m$) includes a plurality of content 110($k$), where "k" can be any integer from one to "K", which is available for access over the Internet 108. The content provider 102($m$) may provide a variety of functionality for distribution and management of the content 110($k$), such as digital rights management, payment processing, location and communication of the content 110($k$), and so on.

To gain access to the content 110($k$) over the Internet 108, each of the plurality of clients 104(1)-104(N) obtains a communicative coupling with the service provider 106 via a corresponding one of a plurality of access points 112($p$), where "p" can be any integer from one to "P". The access points 112($p$) may be configured in a variety of ways to provide access to the service provider 106. For example, each access point 112($p$) may provide a plurality of telephone numbers for "dial-up" access, each access point may correspond to a single telephone number, one or more of the access points 112($p$) may be a wireless access point to provide a wireless communicative coupling (e.g., via a wireless wide area network (WAN), wireless telephone network for placing a wireless telephone call), a data distribution point for access by a computing device, and so on.

The plurality of access points 112($p$) may be provided by one or more of a plurality of access point providers 114($j$), where "j" can be any integer from one to "J". For example, the service provider 106 may enter into a contractual agreement with the plurality of access point providers 114($j$) (e.g., telecommunications companies) for an amount of guaranteed capacity from each of the access points 112($p$). Therefore, the access points 112($p$) are illustrated in FIG. 1 as a part of the service provider 106 to indicate that the service provider 106 may manage capacity obtained through an agreement with a provider of the physical access point, such as a wireless node, an access port, and so on.

In the illustrated implementation, each of the access points 112($p$) is configured to provide one or more "dial-up" access numbers for accessing the service provider 106 over a telephone network. For example, each of the clients 104(1), 104($n$), 104(N) may include a respective one of a plurality of communication modules 116(1), 116($n$), 116(N). Communication module 116($n$), when executed by client 104($n$) for instance, may utilize access point 112($p$) to attempt access with the service provider 106.

Data describing the attempted access may be stored by the service provider as "access point data" 118($d$), where "d" can be integer from one to "D", in a database 120. The access point data 118($d$) may be obtained by the service provider 106 in a variety of ways. For example, the service provider 106 may obtain client logs from each of the client 104(1)-104(N) when a successful connection is obtained between the clients 104(1)-104(N) and the service provider 106. Each client log may describe attempts made by the respective client 104(1)-104(N) to access the service provider 106. The access point data 118($d$) may also include data obtained by the service provider 106 from other sources, such as through observation of which access points 112($p$) are active, contractual capacity guaranteed for each of the access points 112($p$), cost of providing each of the access points 112($p$) (e.g., contractually agreed upon cost-per-hour, tiered pricing options, and so on), quality of service observed, and so forth. Thus, the access point data 118($d$) may describe a plurality of characteristics of the access point 112($p$), including how the access points 112($p$) are configured to provide access to the clients 104(1)-104(N), experience of the clients 104(1)-104(N) with the access points 112($p$), and so on.

The access point data 118($d$) may be utilized by a manager module 122 in a wide variety of ways. For example, the manager module 122 is illustrated as including a connectivity score module 124 and a capacity module 126. The connectivity score module 124 is representative of functionality for generating a connectivity score for each of the plurality of access points 112($p$) which are described by the access point data 118($d$). The connectivity scores generated by the connectivity score module 124 may be utilized to compare the access points 112($p$), one to another, for a variety of purposes.

The connectivity scores, for instance, may be utilized by the manager module 122 to determine which of the plurality of access points 112($p$) are referenced in each of a plurality of access point lists 128($j$), where "j" can be any integer from one to "J", which are illustrated as stored in a database 130. For example, the manager module 122 may select access points 112($p$) for inclusion (i.e., reference) in an access point list for communication to respective clients 104(1)-104(N). The access point list 128($j$) references which of the plurality of access points 112(p) are to be utilized by the clients 104(1)-104(N). Further discussion of connectivity score usage may be found in relation to FIGS. 2 and 6.

The capacity module 126, when executed, may be utilized to determine an amount of capacity available from each of the plurality of access points 112(p). For example, the capacity module 126, when executed, may "learn" a capacity limit for each of the access points. This learned capacity limit may then be utilized in a variety of ways. For example, the learned capacity limit may be utilized in connection with the calculation of the connectivity scores by the connectivity score module 124 for the access points 112(p) to determine which access points 112(p) are assigned to which clients 104(1)-104(N) through use of the access point lists 128(j). Further discussion of calculation of the learned capacity limit may be found in relation to FIGS. 3-5, and use of the learned capacity limit in conjunction with a connectivity score may be found in relation to FIG. 6.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module or logic represents program code that performs specified tasks when executed on a processor (e.g., CPU or CPUs). The program code can be stored in one or more computer readable memory devices, further description of which may be found in relation to FIG. 2. The features of the capacity management techniques described below are platform-independent, meaning that the techniques may be implemented on a variety of commercial computing platforms having a variety of processors.

Figure 2:
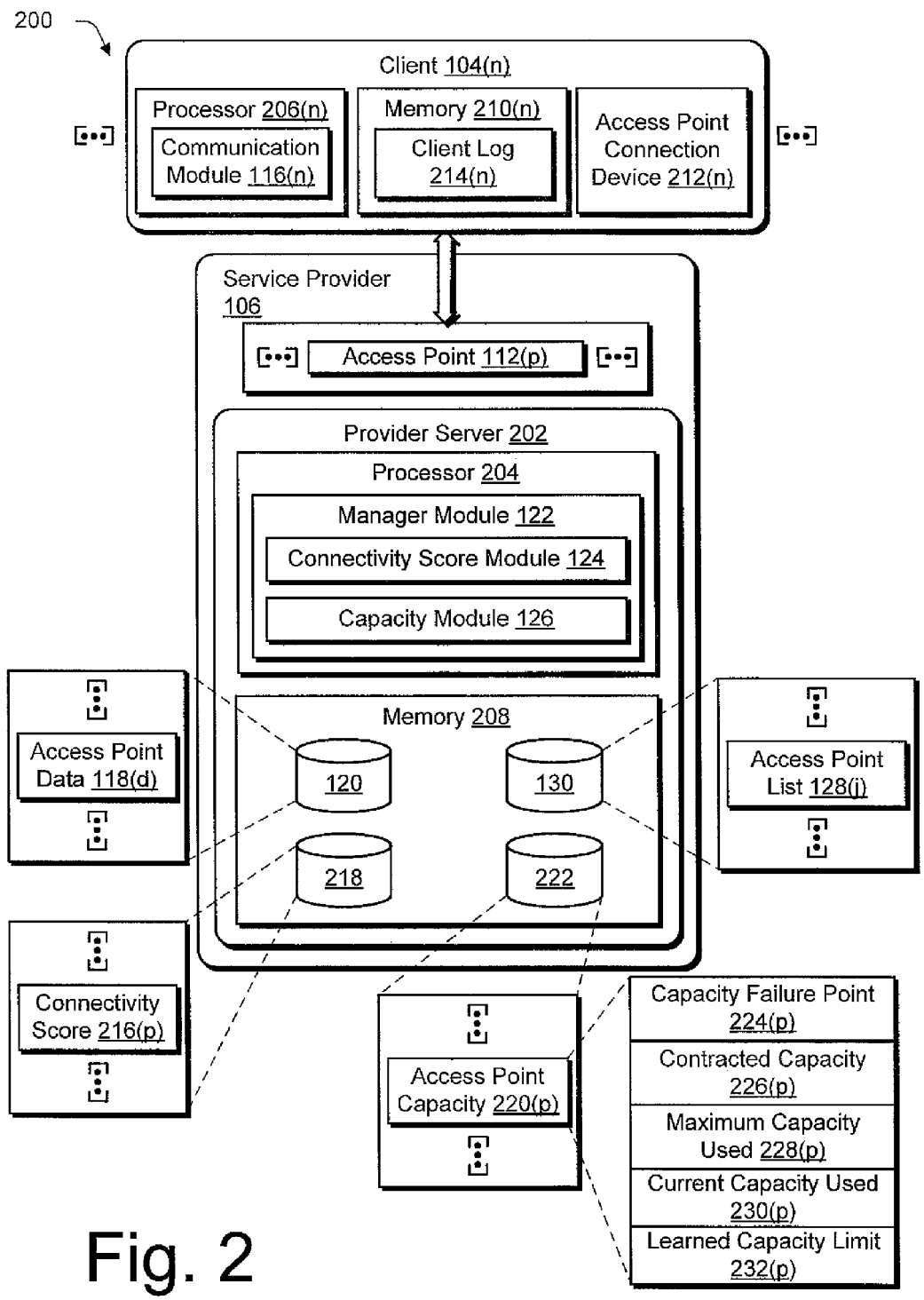
FIG. 2 is an illustration of a system in an exemplary implementation showing a client and a service provider of FIG. 1 in greater detail.

FIG. 2 is an illustration of a system 200 in an exemplary implementation showing the plurality of clients 104(n) and the service provider 106 of FIG. 1 in greater detail. The system 200 of FIG. 2 is representative of an exemplary network environment that is configured to implement the environment 100 of FIG. 1 through use of a variety of computing devices. For example, the service provider 106 is illustrated as including a provider server 202 and the client 104(n) is illustrated as a client device. Accordingly, the provider server 202, and the client 104(n) are each illustrated as including a respective processor 204, 206(n) and a respective memory 208, 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210(n) is shown, respectively, for the provider server 202 and the client 104(n), each memory 208, 210(n) may be representative of a wide variety of types and combinations of memory that may be employed, such as random access memory (RAM), hard disk memory, removable medium memory, and so forth. For example, the database for storing the access point data 118(d) may be implemented in RAM and the database 130 for storing the access point list 128(j) may be implemented as a hard disk drive. A variety of other implementations are also contemplated.

The client 104(n) includes the communication module 116(n) which is illustrated as being executed on the processor 206(n) and is storable in memory 210(n) The coininunication module 116(n), when executed, may cause an access point connection device 212(n) to attempt a connection with the service provider 106 via one or more of the access points 112(p). The communication module 116(n) may also be executable to form a client log 214(n) which describes the connection attempts, such as when the connection was attempted, which of the plurality of access points 112(p) were attempted, a result of the attempt (e.g., successful, not successful), type of error encountered (if any), and so on. Further, the communication module 116(n) may be executed to communicate the client log 214(n) to the service provider 106 for storage in the database 120.

The manager module 122 is illustrated as being executed on the processor 204 of the provider server 202 of the service provider 106, and is storable in memory 208. The manager module 122, when executed, may obtain the client log 214(n) communicated by the client 104(n) and store the client log 214(n) in the database 120 as the access point data 118(d). As previously described, the manager module 122 may utilize the access point data 118(d) in a variety of ways.

The manager module 122, for instance, may execute the connectivity score module 124 to process the access point data 118(d) to arrive at a plurality of connectivity scores 216(p) for each of the plurality of access points 112(p), which are illustrated as stored in a database 218. As previously described, each connectivity score 216(p) may be configured as a value which is suitable for comparison, one to another, such that the plurality of access points 112(p) may be compared, one to another. For example, each connectivity score 216(p) may include a relative value (e.g., a numerical score) which is generated based on a plurality of connectivity factors. Therefore, the network administrator may specify which of the connectivity factors are to be utilized to generate the connectivity score 216(p), assign weights to the connectivity factors, and so on, based on a variety of considerations. Thus, the connectivity scores 216(p) generated by the connectivity score module 124 reflect the considerations specified by the network administrator using the plurality of connectivity factors.

The manager module 122, for instance, may utilize the connectivity scores 216(p) to determine which access points 112(p) will be referenced in an access point list 128(j) or communication to the client 104(n). Therefore, the selection of access points 112(p) based on the connectivity scores 216(p) may address the considerations utilized to generate the connectivity score 216(p). Further discussion of the formation of access point lists through use of connectivity scores 216(p) may be found beginning in relation to FIG. 3.

A variety of connectivity factors may be specified for by the connectivity score module 124. For example, a cost weight may be specified for describing how much of an effect that cost of providing the access point 112(p) is to have on the connectivity score 216(p). A quality-of-service weight may also be specified for describing how much of an effect quality-of-service of the access point 112(p) is to have on the connectivity score 216(p). Provider preferences may also be specified. For example, the service provider 106 may enter into contractual relationships with the access point provider 114(j) of FIG. 1 (e.g., a telecommunications company) which provides the actual physical infrastructure of the access point 112(p). Therefore, the provider preferences may be used to specify which telecommunications company is preferred in the computation of the connectivity score 216(p).

The capacity module 126, when executed, may also provide data for processing by the connectivity score module 124 to arrive at the connectivity scores 216(p). The capacity module 126, for instance, may be executed to obtain access point capacity 220(p) data from a database 222 for each of the plurality of access points 112 of the service provider 106. The access point capacity 220(p) data may then be retrieved by the connectivity score module 124 for computing the connectivity score 216(p). For example, the access point capacity 220(p) data may describe a capacity failure point 224(p) for the access point 112(p). The capacity failure point 224(p), for instance, may be configured as a capacity failure rate threshold which describes an acceptable rate of failure for access attempts made to the access point 112(p). Thus, the capacity failure point 224(p) may act as a threshold for describing acceptable operation of the access point 112(p).

The access point capacity 220(p) may also include a contracted capacity 226(p) for the access point 112(p). For example, the service provider 106 may enter into a contractual relationship with the access point provider 114(j) to provide an agreed-upon amount of capacity to the plurality of clients 104(n) at any one time, such as to permit "n" number of clients to utilize the access point 112(p) to access the service provider 106. The contracted capacity 226(p) may be obtained in a variety of ways, such as through entry by a network administrator of the service provider 106, through communication with the access point provider 114(j) of FIG. 1, and so on.

The access point capacity 220(p) data may also describe a maximum capacity 228(p) utilized by the access point 112(p) during a measurement interval. For example, the capacity module 126 may monitor the access point 112(p) for an hour and determine that during that hour the maximum number of clients 104(n) which accessed the access point 112(p) was one hundred. The access point capacity 220(p) data may also describe a current capacity 230(p) of the access point 112(p) which is being utilized, such as a current number of clients 104(n) which were accessing the access point 112(p), and so on.

The capacity module 126 may also be executed to process data to arrive at values which may be utilized to manage capacity of the plurality of access points 112(p). For example, the capacity module 126, when executed, may generate a learned capacity limit 232(p) for the access point 112(p). The learned capacity limit 232(p), for instance, may be computed as a historical value of maximum capacity used 228(p) without reaching the capacity failure point 224(p). The learned capacity limit 232(p) may be utilized in the computation of the connectivity score 216(p) to dynamically decrease the connectivity score 216(p) for the access point 112(p) as current capacity used 230(p) by the access point 112(p) approaches the learned capacity limit 232(p). Thus, when the learned capacity limit 232(p) approached within a given measurement interval, it may be utilized as a disincentive to assignment of the access point 112(p) in the access point list 128(j) for use by the client 104(n) through use of the connectivity score 216(p), further discussion of which may be found in relation to FIG. 6.

Exemplary Procedures

The following discussion describes capacity management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

In portions of the following discussion, reference will be made to the environment 100 of FIG. 1 and the system 200 of FIG. 2.

Figure 3:
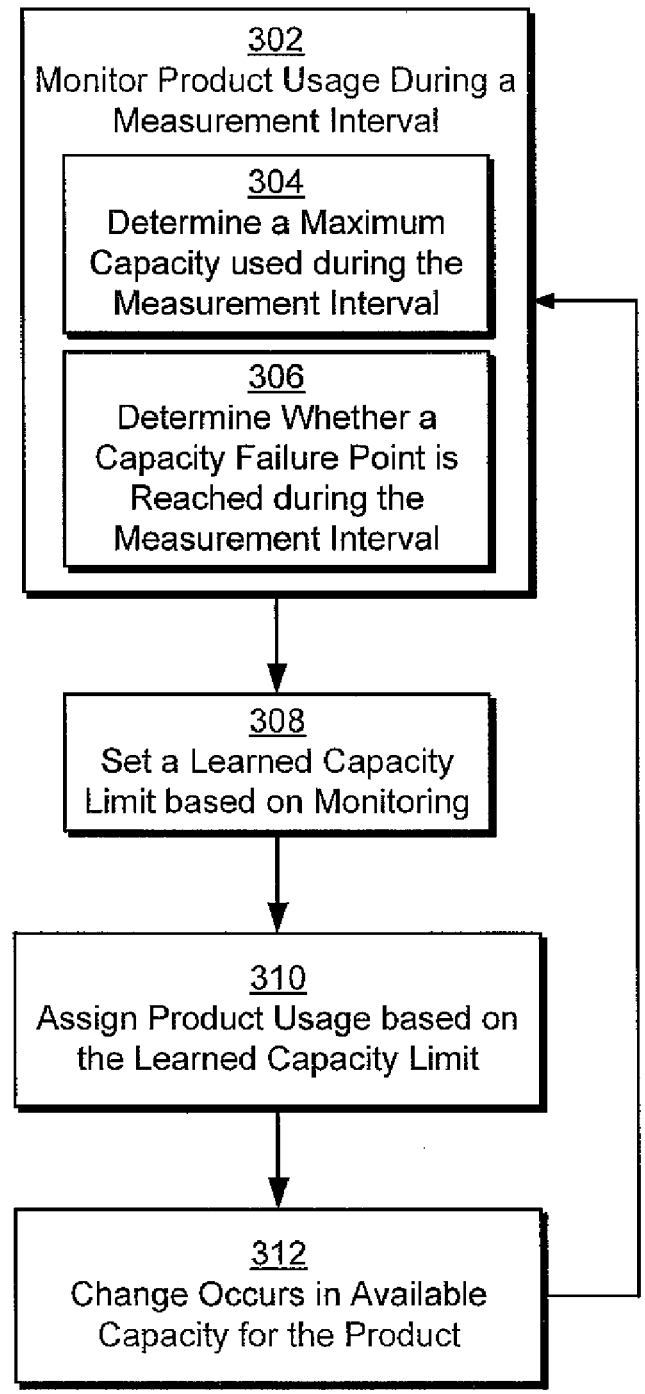
FIG. 3 is a flow diagram depicting a procedure in an exemplary implementation in which a learned capacity limit is set for a product by monitoring product usage during a measurement interval.

FIG. 3 is a flow diagram depicting a procedure 300 in an exemplary implementation in which a learned capacity limit is set for a product through monitoring product usage during a measurement interval. Product usage is monitored during a measurement interval (block 302). For example, the manager module 122, when executed, may monitor usage of the access point 112(p) by the plurality of clients 104(1)-104(N). During the execution, the manager module may determine a maximum capacity of the product which was used during the measurement interval (block 304). The maximum capacity may be expressed in a variety of ways, such as the number of clients 104(1)-104(N) which accessed the access point 112(p), amount of bandwidth utilized by the plurality of clients 104(1)-104(N) collectively, and so on. The manager module may also determine whether a capacity failure point is reached during the measurement interval (block 306). For example, the capacity failure point 224(p) may be expressed as a threshold capacity failure rate for the access point 112(p), such as "X" failed access attempts during measurement interval "Y".

A learned capacity limit is set based on the monitoring (block 308). For example, if the determined maximum capacity used during the measurement interval (block 304) did not cause the capacity failure point to be reached during the measurement interval (block 306), the learned capacity limit may be set according to the determined maximum capacity (block 304). However, if the capacity failure point was reached during the measurement interval (block 306), the learned capacity limit may be set equal to a previous learned capacity limit that did not result in reaching the capacity failure point. Further discussion of setting the learned capacity limit may be found in relation to FIGS. 4 and 5.

Product usage is then assigned based at least in part on the learned capacity limit (block 310). For example, the manager module 122 may determine that the access point 112(p) has sufficient capacity for a particular number of additional clients and then form access point lists 128(j) for the clients which reference the access point 112(p). In another example, the connectivity score module 124 may utilize the learned capacity limit to calculate a connectivity score 216(p) for the access point 112(p). As the access point is assigned to additional clients 104(n), the connectivity score 216(p) may utilize a disincentive (e.g., dynamically adjusted "downward") such that as the anticipated capacity for the access point 112(p) approaches the learned capacity limit 232(p), the access point 112(p) is assigned to fewer and fewer clients. Additional discussion of the use of the learned capacity limit 232(p) in conjunction with the connectivity score 216(p) may be found in relation to FIG. 6.

This portion (blocks 302-310) of procedure 300 may be repeated when a change occurs in available capacity for the product (block 312). For example, the manager module 122 may continue to monitor the access point (block 302) and set the learned capacity limit based on the monitoring (block 308). Therefore, the manager module 122 may address changing amounts of capacity that are available for the access point 112(p). Similar techniques may be applied to manage a plurality of products by the manager module 122 to determine which clients 104(n) are assigned to use which products, further discussion of which may be found in relation to the following figure.

Figure 4:
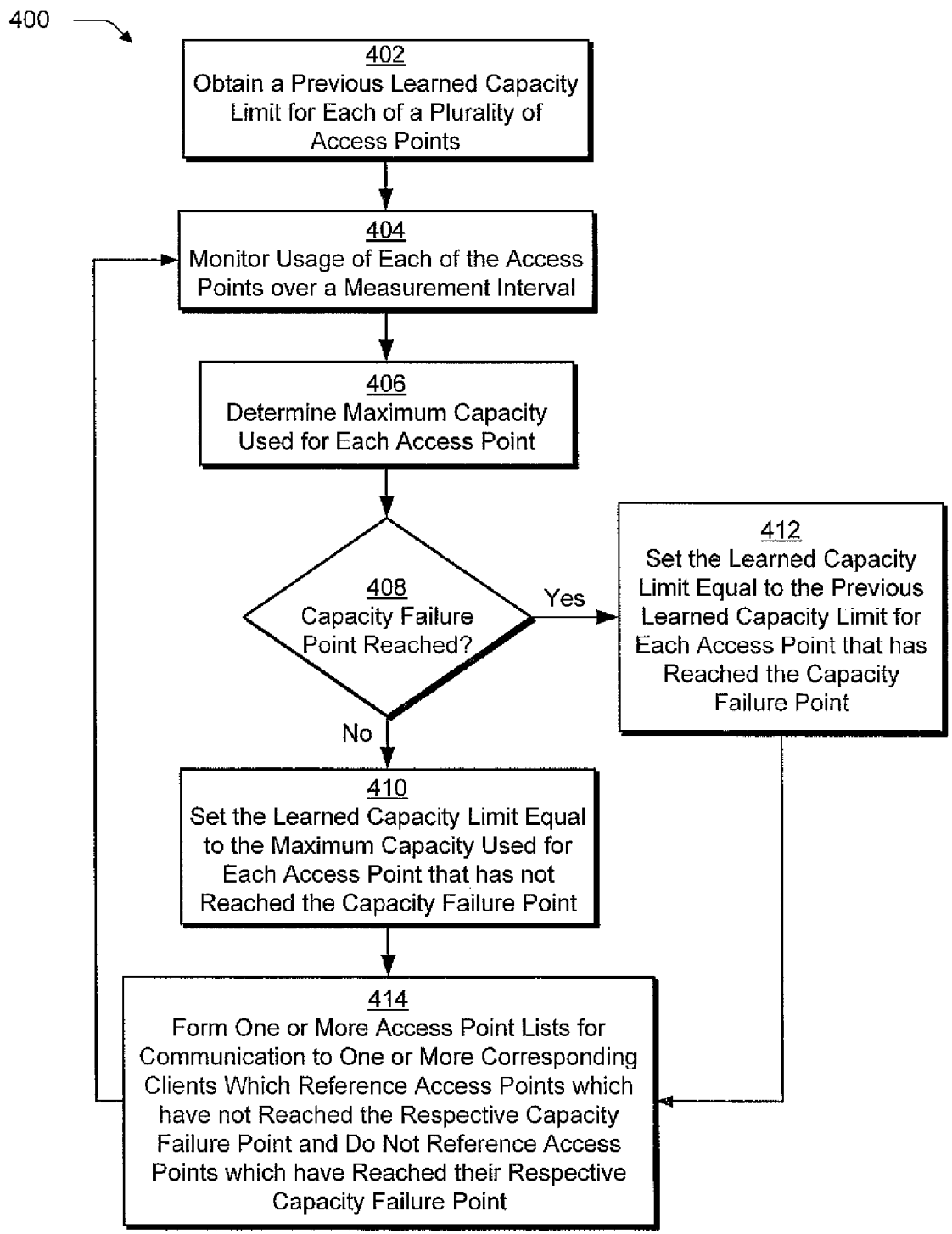
FIG. 4 is a flow diagram depicting a procedure in an exemplary implementation in which a learned capacity limit is set for each of a plurality of access points and then utilized to assign particular clients to utilize particular access points through use of access point lists.

FIG. 4 is a flow diagram depicting a procedure 400 in an exemplary implementation in which a learned capacity limit is set for each of a plurality of access points and then utilized to assign particular clients to utilize particular access points through use of access point lists. A manager module 122 obtains data describing a previous learned capacity limit 232 (p) for each of a plurality of access points 112(p) (block 402). For example, the manager module, when executed, may collect data describing the previous learned capacity limit 232(p) from access point capacity 220(p) data utilized to compute the connectivity score 216(p) by the connectivity score module 124.

The manager module, when executed, monitors usage of each of the access points 112(p) over a measurement interval (block 404). For example, the manager module may monitor usage over a ten minute interval, an hour, a day, and so forth. The manager module may then determine a maximum capacity used for each access point (block 406) during the measurement interval. As previously described, the maximum capacity used may be expressed in a variety of ways, such as number of clients (further discussion of which may be found in relation to FIG. 5), bandwidth used, percentage of available capacity used, and so forth.

For each access point, a determination is made as to whether a capacity failure point has been reached (decision block 408). For instance, the capacity failure point may indicate that "X" number of failed access attempts are permitted during the measurement interval. The capacity failure point may be set in a variety of ways, such as based on typical connectivity observed for access points due to hardware, software, and/or network errors by the client 104(n), access point provider 114(j) and/or service provider 106, number of failed access attempts which are viewed as "permissible" by the clients 104(n) as based on client feedback, and so on.

When the capacity failure point has not been reached ("no" from decision block 408), the learned capacity limit is set to reflect the maximum capacity used for each access point that has not reached the capacity failure point (block 410). Therefore, the learned capacity limit may be "reset" to reflect additional capacity which is observed as available from the access points. For example, the previous learned capacity limit may have indicated that "X" amount of capacity is available from the access point 112(p). By monitoring use of the access point 112(p), the manager module may observe that an additional amount of capacity "Y" is available which did not result in reaching (e.g., exceeding) the capacity failure point. Therefore, the manager module 122 may reset the learned capacity limit to reflect this additional capacity "Y".

When the capacity failure point has been reached ("yes" from decision block 408), however, the learned capacity limit is set equal to the previous learned capacity limit used for each access point that has reached the capacity failure point (block 412). Continuing with the example, the previous learned capacity limit which was set to address the additional amount of capacity "Y" may have resulted in a capacity failure point to be reached over a subsequent measurement interval. Therefore, the learned capacity limit may be reset to match the previous learned capacity limit that did not result in the access point reaching the capacity failure point, such as back to an "X" amount of capacity.

The manager module then forms one or more access point lists for communication to one or more corresponding client which reference access point which have not reached the respective capacity failure points and do not reference access points which have reached their respective capacity failure point (block 414). Therefore, in this example access points which are operating "above" capacity are not assigned to additional clients while access points which are operating "below" capacity are assigned to additional clients. The procedure 400 may be iterative and proceed back to monitor usage of each of the access points (block 404). Therefore, the use of the access points may be managed to reflect changing capacity of the access points over a plurality of measurement intervals.

Figure 5:
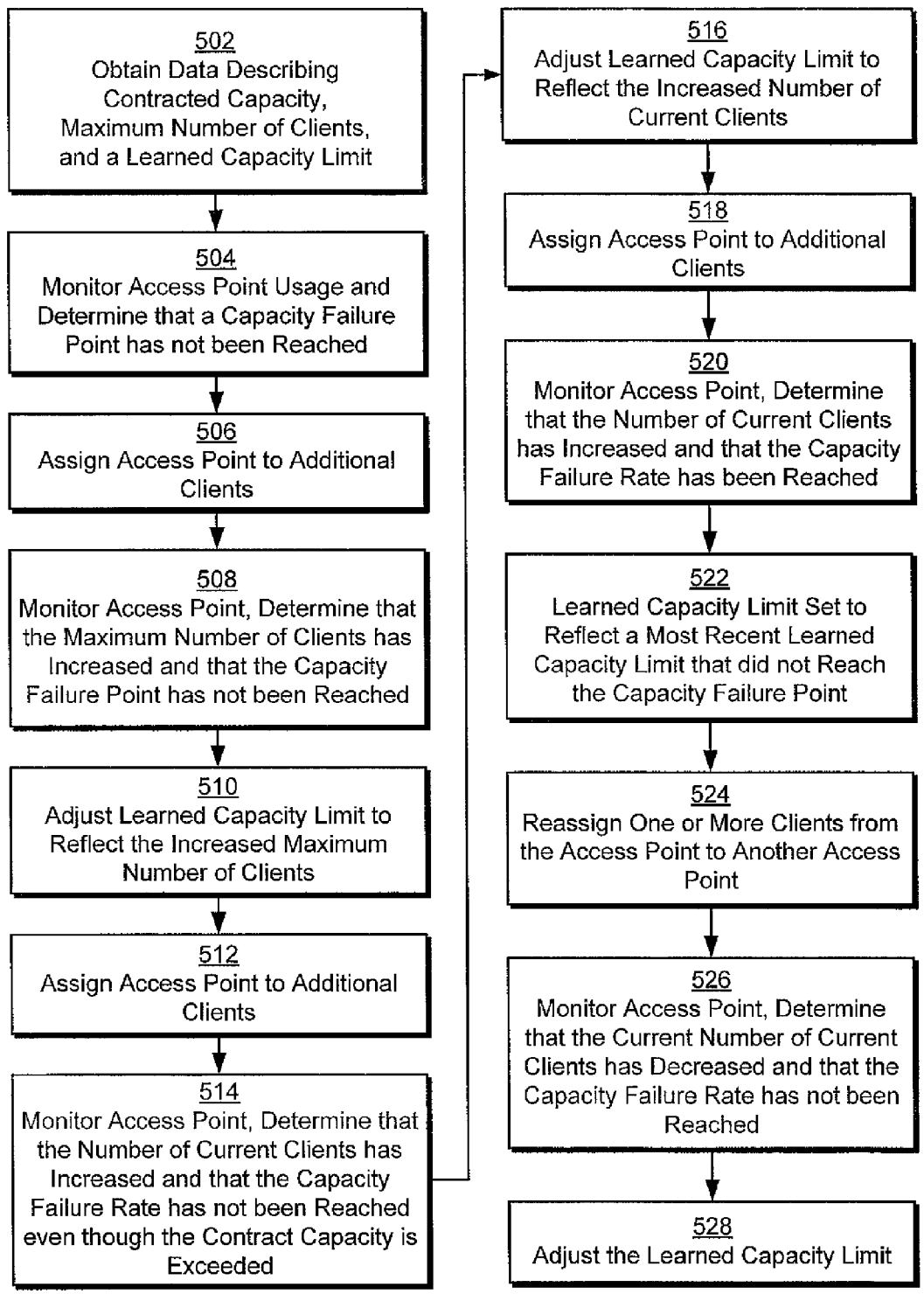
FIG. 5 is a flow diagram depicting a procedure in an exemplary implementation in which dynamic setting of a learned capacity limit is described for use in managing capacity of a plurality of access points.

FIG. 5 is a flow diagram depicting a procedure 500 in an exemplary implementation in which dynamic setting of a learned capacity limit is described for use in managing capacity of a plurality of access points. In this procedure 500, capacity will be described using numbers of clients. As previously described, however, capacity may be expressed in a variety of different ways using a variety of different units.

A manager module obtains data describing a contracted capacity, a maximum numbers of clients, and a learned capacity limit for an access point (block 502). For example, the manager module may identify that the contracted capacity for a first measurement interval is 70 clients at any one time and the maximum number of clients which used the access point during the measurement interval is 40. Additionally, the manager module may set the learned capacity limit at 60, such as to mimic a learned capacity limit obtained from another similar access point. In this instance, the total number of clients which have utilized the access point over the measurement interval is 100, which is shown in the following table for the first interval as follows.

| FIRST MEASUREMENT INTERVAL | | | |
|---|---|---|---|
| Learned Capacity Limit | Total Number of Clients | Maximum Number of Clients | Contracted Capacity |
| 60 | 100 | 40 | 70 |

The manager module also monitors access point usage over the first measurement interval and determines that a capacity failure point has not been reached (block 504). Therefore, the manager module assigns the access point to additional clients (block 506), such as to another sixty-five clients.

The manager module monitors the access point over a second measurement interval and determines that the maximum number of clients observed has increased and that the capacity failure point has not been reached (block 508). For example, the manager module may observe that the assigning of the access point to the additional clients (block 506) resulted in an increase of 26 additional clients which used the access point during the second measurement interval. Therefore, the maximum number of clients which used the access point is now 66 and the total number of clients which used the access point over the second measurement interval is 165. Accordingly, the manager module adjusts the learned capacity limit to reflect the increased maximum number of clients (block 510), which in this instance involves setting the learned capacity limit equal to the maximum number of clients monitored over the second measure interval.

| SECOND MEASUREMENT INTERVAL | | | |
|---|---|---|---|
| Learned Capacity Limit | Total Number of Clients | Maximum Number of Clients | Contracted Capacity |
| 66 | 165 | 66 | 70 |

Since the capacity failure point has not been reached, the manager module assigns the access point to additional clients (block 512). For example, the manager module may "know" that the connectivity failure point has not been reached and therefore assign the access point to another 15 clients. This assignment, for instance, may be performed dynamically based on a relationship of the maximum number of clients to the learned capacity limit, further discussion of which may be found in relation to FIG. 6.

The manager module monitors the access point over a third measurement interval and determines that the maximum number of clients observed has increased and that the capacity failure point has not been reached even though the contract capacity is exceeded (block 514). For example, the manager module may observe that the assigning of the access point to the additional clients (block 512) resulted in an increase of 6 clients which used the access point during the third measurement interval. Therefore, the maximum number of clients which used the access point is 72 and the total number of clients which used the access point is now 180. Accordingly, the manager module adjusts the learned capacity limit to reflect the increased maximum number of clients (block 516), which in this instance also involves setting the learned capacity limit equal to the maximum number of clients. It should be noted that in this instance, the learned capacity limit of 72 exceeds the contracted capacity of 70. Thus, the learned capacity limit may be utilized to "find" additional capacity that is available from the access point beyond the contractually agreed upon amount. For example, the access point provider 114(j) may contractually guarantee a particular amount of capacity, but be able to provide additional capacity that in this instance was "found" by the manager module. A description of the third measurement interval is included in the following table.

| THIRD MEASUREMENT INTERVAL | | | |
| --- | --- | --- | --- |
| Learned Capacity Limit | Total Number of Clients | Maximum Number of Clients | Contracted Capacity |
| 72 | 180 | 72 | 70 |

Since the capacity failure point has not been reached, the manager module assigns the access point to additional clients (block 518).

The manager module monitors the access point over a fourth measurement interval and determines that the maximum number of clients observed during the interval has increased and the capacity failure point has been reached (block 520). In this example, the assignment of the access point to the additional clients (block 518) resulted in an increase of 6 additional clients which used the access point during the fourth measurement interval. Therefore, the maximum number of clients which used the access point is 78 and the total number of clients which used the access point during the fourth measurement interval is 195. Because the congestion failure point has been reached, the manager module does not adjust the learned capacity limit "upward", but rather sets the learned capacity limit to reflect a most recent measurement interval that did not reach the capacity failure point (block 522). In the current example this causes the learned capacity limit to remain set at 72. The fourth measurement interval is also described in the following table.

| FOURTH MEASUREMENT INTERVAL | | | |
| --- | --- | --- | --- |
| Learned Capacity Limit | Total Number of Clients | Maximum Number of Clients | Contracted Capacity |
| 72 | 195 | 78 | 70 |

Because the capacity failure point has been reached, the manager module reassigns clients (e.g., ten clients) from the access point to another access point (block 524).

The manager module monitors the access point over a fifth measurement interval and determines that the maximum number of clients observed has decreased and the capacity failure point has not been reached (block 526). For example, the manager module may observe from monitoring that the reassigning (block 524) in this example resulted in a decrease of 4 clients from using the access point during the fifth measurement interval. Therefore, the maximum number of clients using the access point is 74 and the total number of clients which have used the access point during the measurement interval is 185. Accordingly, the manager module adjusts the learned capacity limit to reflect the maximum number of clients (block 528), which in this example involves setting the learned capacity limit equal to the maximum number of clients for the fifth measurement interval. In this instance, the learned capacity limit of 74 also exceeds the contracted capacity of 70, but does not cause the access point to reach the capacity failure point.

| FIFTH MEASUREMENT INTERVAL | | | |
| --- | --- | --- | --- |
| Learned Capacity Limit | Total Number of Clients | Maximum Number of Clients | Contracted Capacity |
| 74 | 185 | 74 | 70 |

It should be noted that this process may continue as the capacity of the access point changes, such as due to use of the access point by other service providers. Therefore, the learned capacity limit may be dynamically set to reflect changing capacities of a product.

Figure 6:
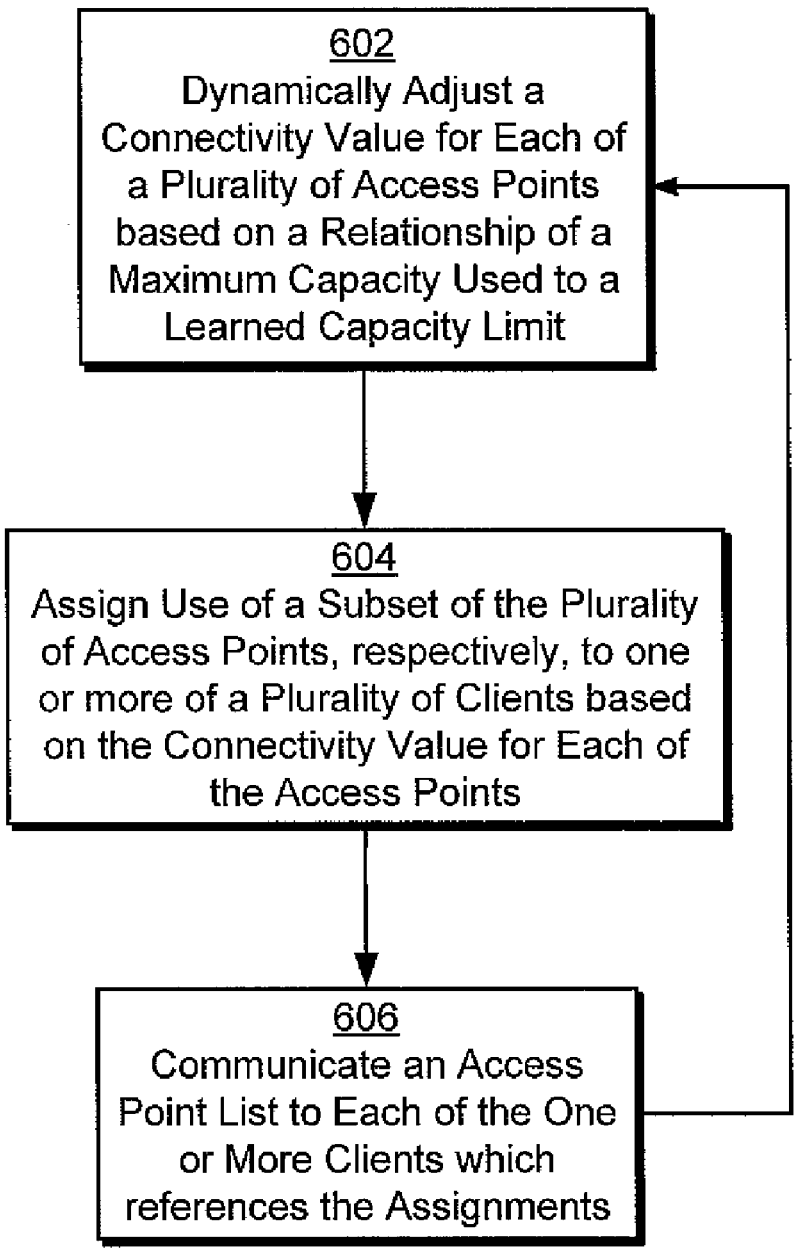
FIG. 6 is a flow diagram depicting a procedure in an exemplary implementation in which connectivity values are dynamically adjusted based on respective learned capacity limits for assigning a subset of a plurality of access points for utilization by respective clients.

FIG. 6 is a flow diagram depicting a procedure 600 in an exemplary implementation in which connectivity values are dynamically adjusted based on respective learned capacity limits for assigning a subset of a plurality of access points for utilization by respective clients. A manager module dynamically adjusts a connectivity value for each of a plurality of access points based on a relationship of a maximum capacity used by the access point, over a measurement interval, to a learned capacity limit (block 602).

As previously described, connectivity scores may be utilized to compare the access points, one to another, for a variety of purposes. For example, each connectivity score may include a relative value (e.g., a numerical score) which is generated based on a plurality of connectivity factors. A variety of connectivity factors may be specified for use by the connectivity score module, such as a cost weight, a quality-of-service weight, provider preferences, and so on. Therefore, the connectivity score for each access point may be configured as a numerical score generated based on the plurality of connectivity factors for comparison of the access points, one to another.

In an implementation, the learned capacity limit may be utilized as one of the factors for calculating the connectivity value. For example, the manager module may adjust the connectivity value based on "how close" the maximum capacity utilized during a measurement interval for an access point is to a learned capacity limit for the access point. As the maximum capacity approaches the learned capacity limit, the connectivity value may be adjusted such that it will be less likely that the access point is chosen for assignment to one or more of the clients.

The manager module, therefore, may assign use of a subset of the plurality of access points, respectively, to one or more of a plurality of clients based on the connectivity value for each of the access points (block 604). For example, all other connectivity factors being equal, an access point having a "maximum capacity used" that is approaching its respective "learned capacity limit" may have a connectivity score which makes it less likely to be chosen for inclusion in an access point list than another access point having another "maximum capacity used" that is not approaching its respective "learned capacity limit". Thus, the learned capacity limit may be utilized as one of a variety of connectivity factors for calculation of the connectivity value. Once the subset of the plurality of access points has been assigned, an access point list is communicated to each of the one or more clients which reference the assignments (block 606). Therefore, each of the clients may be provided with an access point list which is configured to enable the client to access a particular subset of the plurality of access points.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method executed by a module stored in memory on a computing device, the method comprising:
   monitoring use of an access point during a plurality of measurement intervals to determine:
      a maximum capacity of the access point during each measurement interval; and
      whether a capacity failure point is reached during each measurement interval, the capacity failure point being an acceptable rate of failure for access attempts made to the access point;
   based on the monitoring of the access point during a first measurement interval of the plurality of measurement intervals, setting a learned capacity limit of the access point after a second measurement interval of the plurality of measurement intervals, subsequent to the first measurement interval, as follows:
      setting the learned capacity limit to the maximum capacity of the second measurement interval of the access point when the access point does not reach the capacity failure point;
      setting the learned capacity limit to the maximum capacity of the first measurement interval of the access point when the capacity failure point reaches the capacity failure point;
   dynamically adjusting a connectivity value for the access point based on a relationship of the maximum capacity of the second measurement interval to a learned capacity limit of the first measurement interval, the learned capacity limit varying for the plurality of measurement intervals, with the connectivity value being a numerical score; and
   determining whether one or more of a plurality of clients are to receive a list referencing at least the access point to assign use of the access point to one or more of the plurality of clients based on the connectivity value of the access point.

2. A method as described in claim 1, wherein:
   the module is executed by an access point provider.

3. A method as described in claim 2, wherein the access point is selected from a group consisting of:
   one or more telephone numbers;
   a wireless access point; and
   a data distribution point.

4. A method as described in claim 1, wherein the capacity failure point is configured as a capacity failure rate threshold.

5. A method as described in claim 1, wherein:
   the capacity failure point is configured as a capacity failure rate threshold;
   the access point selected from a group consisting of:
   one or more telephone numbers,
   a wireless access point, and
   a data distribution point;
   the module is executed by an access point provider;
   the access point is an access number for obtaining Internet access;
   the list includes a plurality of references to a plurality of said access numbers; and
   the list is configured for communication to a corresponding said client over a network.

6. A method as described in claim 1, wherein at least one said learned capacity limit exceeds a contracted capacity for the monitored access point.

7. A method of described in claim 1, further comprising when the capacity failure point is reached the learned capacity limit is set according to a previous learned capacity limit which did not result in reaching the learned capacity limit.

8. A method as described in claim 1, further comprising assigning one or more of the plurality of clients to receive the list during a subsequent said measurement interval based on the set learned capacity limit.

9. A method comprising:
   determining whether a capacity failure point has been reached of each of a plurality of access points being utilized during a plurality of measurement intervals;
   determining a maximum capacity of each of the plurality of access points being utilized during the plurality of measurement intervals;
   dynamically adjusting a connectivity value for each of the plurality of access points, for each measurement interval of the plurality of measurement intervals, based on a relationship of the maximum capacity determined during a current measurement interval to a learned capacity limit determined during a previous measurement interval, the learned capacity limit varying for the plurality of measurement intervals, with the connectivity value being a numerical score;
   forming one or more access point lists for one or more of a plurality of clients to assign use of the one or more access points to the one or more plurality of clients based on the connectivity value of each said access point, each access point list referencing one or more said access points based on the determining; and
   reducing a probability that one of the access points is referenced by one of the access point lists when, for each measurement interval, the maximum capacity of the current measurement interval approaches the learned capacity limit of the previous measurement interval; and increasing a probability that one of the access points is referenced by one of the access point lists when, for each measurement interval, the maximum capacity of the current measurement interval departs from the learned capacity limit of the previous measurement interval.

10. A method as described in claim 9, wherein one or more said access points are selected from a group consisting of:
one or more telephone numbers;
a wireless access point; and
a data distribution point.

11. A method as described in claim 9 further comprising:
configuring the access point as an access number for obtaining Internet access; and
including with each said access point list a plurality of references to a respective access number.

12. A method as described in claim 9, wherein:
the capacity failure point is configured as a capacity failure rate threshold; and
at least one said access point has a capacity failure rate threshold which is different from another capacity failure rate threshold for another said access point.

13. A method as described in claim 9, the method further comprising:
for each said access point that has not exceeded a respective said capacity failure point, setting a learned capacity limit based on the maximum number of clients; and
for each said access point that has exceeded a respective said capacity failure point, setting a learned capacity limit based on a previous learned capacity limit.

14. A method as described in claim 13, wherein the previous learned capacity limit did not result in the access point reaching the respective said capacity failure point over a measurement interval, during which, the previous learned capacity limit was applied.

15. A method as described in claim 13, wherein at least one said learned capacity limit exceeds a contractual capacity limit for a corresponding said access point.

* * * * *